US009145870B2

(12) United States Patent
Redin Miqueleiz

(10) Patent No.: US 9,145,870 B2
(45) Date of Patent: Sep. 29, 2015

(54) JOINT BETWEEN THE GEARBOX INPUT SHAFT AND THE ROTOR ROTATION SHAFT

(75) Inventor: Juan Redin Miqueleiz, Sarriguren (Navarra) (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 0 days.

(21) Appl. No.: 13/247,442

(22) Filed: Sep. 28, 2011

(65) Prior Publication Data

US 2012/0093578 A1    Apr. 19, 2012

(30) Foreign Application Priority Data

Oct. 18, 2010 (ES) .................................. 201001337

(51) Int. Cl.
    *F03D 11/02* (2006.01)
    *F16D 1/076* (2006.01)
    *F16D 1/08* (2006.01)

(52) U.S. Cl.
    CPC .............. *F03D 11/02* (2013.01); *F16D 1/076* (2013.01); *F16D 1/0876* (2013.01); *F05B 2240/60* (2013.01); *F05B 2260/30* (2013.01); *Y02E 10/722* (2013.01); *Y10T 29/49865* (2015.01); *Y10T 403/64* (2015.01)

(58) Field of Classification Search
USPC ..................... 403/356, 262, 335; 415/122.1
See application file for complete search history.

(56) References Cited

U.S. PATENT DOCUMENTS

| 4,417,855 | A | * | 11/1983 | Jepsen | ...................... | 416/244 A |
| 5,119,995 | A | * | 6/1992 | Kohler et al. | ............... | 241/261.2 |
| 2009/0015020 | A1 | * | 1/2009 | Stiesdal | .......................... | 290/55 |
| 2009/0258715 | A1 | * | 10/2009 | Rode et al. | ...................... | 464/51 |

FOREIGN PATENT DOCUMENTS

EP               2 075 466 A1     7/2009

* cited by examiner

*Primary Examiner* — Daniel Wiley
(74) *Attorney, Agent, or Firm* — Ladas & Parry LLP

(57) ABSTRACT

The joint between the gearbox input shaft and the rotor rotation shaft is made with a banded flange that combines an interference joint between the horizontal surface of the rotor shaft (4) and the internal surface of the flange (5), with a bolted joint between the vertical surface of the flange (5) and the front surface of the body of the gearbox (4) corresponding to the low speed shaft. The interference joint adds a keyway between both surfaces with their corresponding key (9). Likewise included is an assembly method with a surface treatment at temperature T1, flange heating (5) in an oven at a temperature T2, a banding of the flange (5) on the rotor rotation shaft (4) having the keyway line up with the key (9), a subsequent cooling and finally a bolted joint between the flange (5) and the gearbox (3).

12 Claims, 2 Drawing Sheets

JOINT BETWEEN THE GEARBOX INPUT SHAFT AND THE ROTOR ROTATION SHAFT

OBJECT OF THE INVENTION

The present invention refers to the joint between the shaft from the rotor of wind turbine and the gearbox that modifies the revolutions of the cited shaft to adjust them to the generator's requirements.

The foregoing encompasses wind turbines employed for the production of clean or renewable energies.

BACKGROUND OF THE INVENTION

The standard design of the drive train consists in positioning the gearbox and the electrical generator behind the wind turbine rotor and within the nacelle. This is the most compact configuration. Within this configuration, the rotor rotation shaft design and its integration with the drive train is one of the most fundamental points in the mechanical design of a wind turbine.

Normally, the joint between the rotor rotation shaft and the gearbox is made at the plant and, once assembled, it is mounted inside the nacelle and then transported to the site for installation.

The rotor rotation shaft is mounted on separate bearings and is joined to the gearbox rotation shaft by a friction-type (choke) or bolted joint. This joint in certain machines employs a collar mounted on the outside of the union forming the rotor shaft and the gearbox shaft. The rotor shaft is inserted into the hole in the gearbox shaft. The hydraulic (or mechanical) collar compresses the hollow shaft with the rotor shaft and transmits the moments of torsion by friction.

For machines with an integrated compact train, the joint is bolted and an additive is employed to have a more effective friction surface, as indicated in European patent EP2075466.

Nonetheless, these types of joints could result in the following problems:

The bolted joint and the additives used in the joint for machines with an integrated compact train show little modularity and its maintenance requires maneuvering room in the nacelle. The joint made with a collar demands a delicate adjustment during the axial movement of the elements, not to mention the elevated prices of the materials constituting the collar.

Bolted joints in the field use a combination of bolts and pins to secure flanges smaller than the ones corresponding to transmit solely torsion by friction. This is done to keep from penalizing the size of the gearbox shaft bearing, of the shaft itself, and of the flange. Nevertheless, friction-type joints are more versatile for assembly and disassembly and distribute work and tensions better.

Drive train assembly and subsequent upkeep/maintenance is highly substantial and directly affects the costs of wind turbines. The rotor shaft transfers large amounts of stress and its joint with the gearbox shaft must be calculated in great detail. These elements are rotating shafts and are often covered with their corresponding covers. Their interchangeability and accessibility must be kept in mind.

DESCRIPTION OF THE INVENTION

This new design, and primarily due to a question of space, embraces the development of a combination of bolted joint accompanied by the modularity, versatility and robustness of an interference joint.

Thus, an object of the invention is to obtain a drive train that is lighter than those currently on the market.

Another object of the invention is to achieve a simpler assembly and, in turn, disassembly (for gearbox replacement).

Likewise, another object of the invention is to design and utilize a flange as a single piece in the joint, formed in structural steel and capable of withstanding elevated temperatures during assembly.

Lastly, another object of the invention is that the joint is made with a flange that combines an interference joint and a bolted joint by friction.

The aforementioned is attained with a banded flange and a specific method of assembly whereby the flange is first heated, attending to the stresses marking the assembly interferences. Prior to the delicate process of heating, the piece undergoes a surface treatment so that the flange is protected against corrosion and its coefficient of friction increases. The banded flange represents a pressure element designed to sustain fatigue loads. The keyway and its corresponding key (located between the joined parts) bring the differential for extreme stresses and likewise reduces the dimensions of the band.

The main advantages of this new design are cost and weight reduction, as well as the robustness of the fastening of the flange to the shaft.

BRIEF DESCRIPTION OF THE DRAWINGS

With a view to explaining the preferential method of assembly the rotor rotation shaft and the gearbox input shaft, the following figures are included herein.

DESCRIPTION OF A PREFERENTIAL EMBODIMENT

Figure 1:
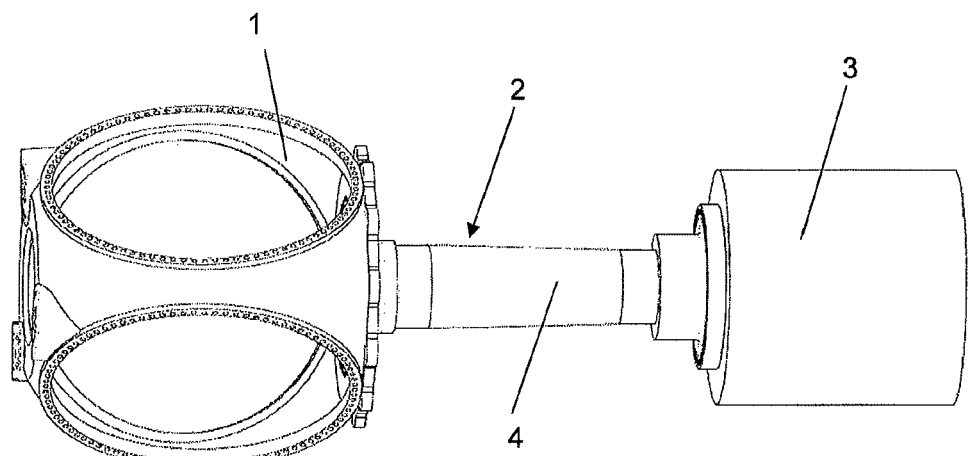
FIG. 1 shows the rotor hub and the part of the drive train that includes the rotor shaft and the gearbox.

As shown in FIG. 1, the wind turbine rotor (1) represented is a helical type for three blades (not shown in the figure). This type of rotor (1) has an enhanced structural and aerodynamic stability compared with rotors of one or two blades. The energy conversion process involves the rotor (1), which converts the wind's kinetic energy into mechanical energy, the drive train (2), which transmits mechanical power developed in the wind turbine to the electrical generator (not shown) through a gearbox (3), and, lastly, the generator, which transforms the mechanical energy into electricity.

The drive train (2), or mechanical transmission system, comprises all the elements and components of a wind turbine that transmit mechanical torque to the rotation shaft. As the rotation speed of the electrical generator does not correspond to the rotation speed of the wind power rotor (1), a gearbox (3) is thus required. The body of the gearbox (3) connects its corresponding low speed part to the rotor shaft (4) or low speed shaft. The most important design parameter is the torque transmitted by the rotor shaft (4) in nominal conditions, although this torque is subject to substantial variations.

In addition to the location of the mechanical brake and whether there are mechanical dampers to reduce the transmission of oscillating torque values, a service factor of the gearbox (3) is its union with the rotor shaft (4).

Figure 2:
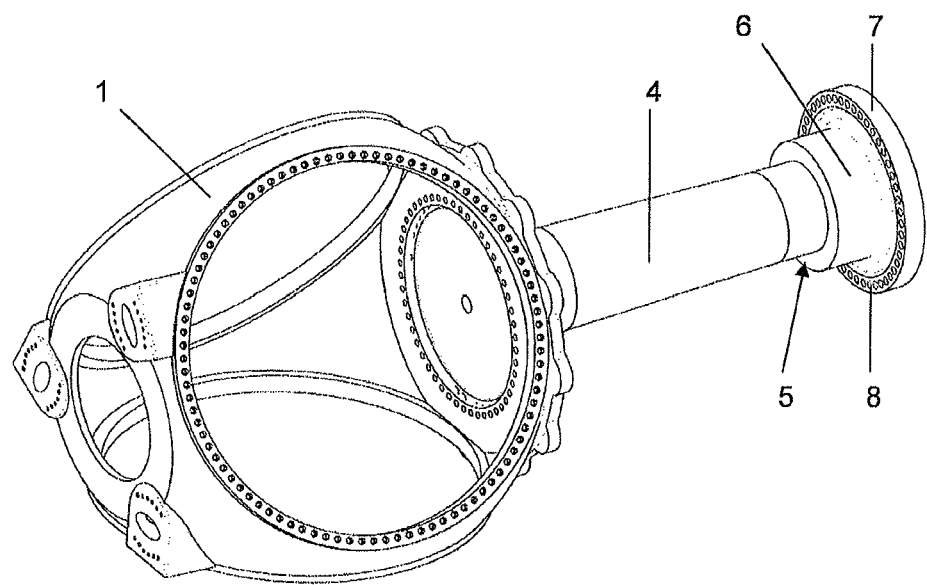
FIG. 2 shows another perspective of the hub and the rotor shaft, with a representation of the banded flange.

In FIG. 2, the rotor shaft (4) has been fitted with a flange (5) that externally encompasses the cited shaft (4). The flange (5) is a single part from a combination of two concentric rings: a first ring (6) having a width greater than its height and a second ring (7) having a width lesser than the previous one and a greater height or external diameter. This second ring (7) has through-orifices (8) towards the shaft of the modules: gearbox and rotor shaft. The joint between the horizontal surface of the rotor shaft (4) with the internal surface of the flange (5) is an interference joint.

Figure 3:
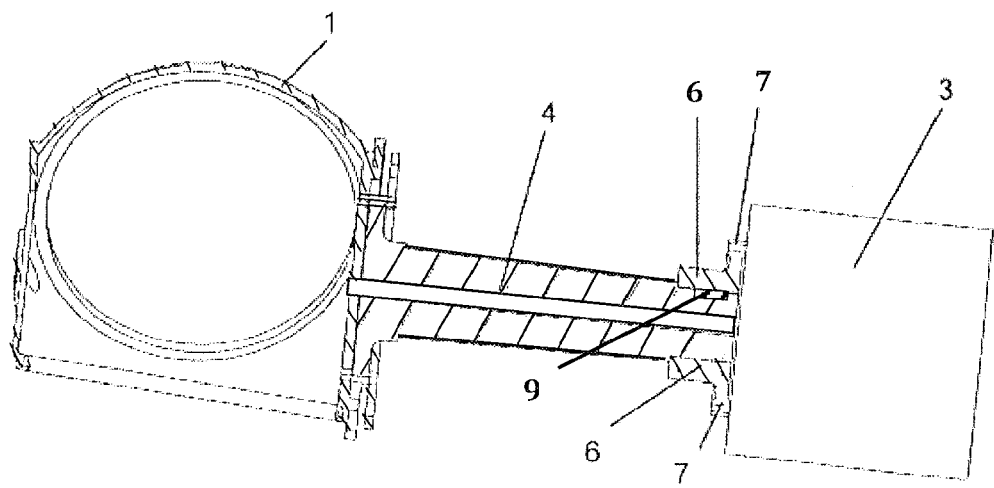
FIG. 3 shows a section of the above figures.
Figure 4:
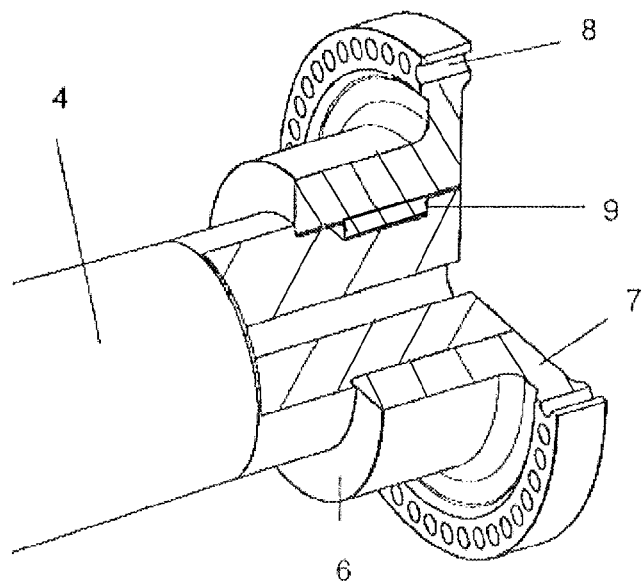
FIG. 4 shows the rotor shaft and the banded flange with a quartered section for both parts.

The joint between the vertical surface of the flange (5) or the part corresponding to the second ring (7) and the front surface of the body of the gearbox (3) is a friction-type bolted joint. As shown in FIGS. 3 and 4, the interference joint between the rotor shaft (4) and the internal surface of the flange (5) adds a keyway and its respective key (9) in a part of the surface of contact.

The variations existing in the stress conditions have been considered in a spectrum of fatigue loads. The maximum fatigue torque and the maximum torque existing in extreme conditions are sustained by the combination of a banded flange (5) and the key (9), which is the load differential element. The foregoing is in line with the load spectrum laid out in standard IEC 61400.

The assembly method for the flange (5) is similar to the method for the lost elements: having been heated and placed in their location, they are considered as lost (such is the case for bearings). The flange (5) is heated in an oven and, while its heating is high, there is no damage to the surface treatment. A surface treatment had been done previously so as to enable it to suitably withstand the banding temperature. The surface treatment is thus applied to the surfaces of both the first ring (6) and the second ring (7).

Once heated, the flange (5) fits onto the rotor shaft (4). In order to combine the loads, the difficulty in the heating and the interferences, a key (9) was added to the rotor shaft (4) that, together with the keyway in the flange (5), creates sufficient balance in the joint. The use of the key (9) contributes in keeping the assembly temperature down and in reducing the weight and consequently the cost of the flange.

After the banded element has cooled sufficiently, the face represented by the flange module (5) is set against the orifices presented by the gearbox module (3). This is then crossed with bolts working at traction and fit parallel to the shafts of the modules. Torsion stress is transmitted by friction.

The invention claimed is:

1. A drive train assembly for a wind turbine comprising:
   a gearbox;
   a rotor;
   a gearbox input shaft connected to the gearbox and a rotor rotation shaft connected to the rotor,
   the rotor rotation shaft having a radially outer surface and the gearbox input shaft having a front surface, the gearbox input shaft and the rotor rotation shaft being connected to each other by a union with a flange comprising a base portion with a vertical end surface and a band extending axially from the base portion;
   the flange further comprising a plurality of bolts extending through the base portion of the flange and into the front surface of the gearbox input shaft,
   wherein the band has a radially internal surface and forms an interference joint between the radially outer surface of the rotor rotation shaft and the radially internal surface of the band, the flange being banded on the rotor rotation shaft by means of the interference joint; and
   wherein the interference joint includes a keyway between the rotor rotation shaft and the radially internal surface of the flange.

2. The drive train assembly according to claim 1, wherein the keyway is inside the rotor rotation shaft extending along an outer edge of the periphery of said rotor rotation shaft, and a key is inside the keyway.

3. The drive train assembly according to claim 1, wherein the flange is a single part and made of structural steel.

4. A drive train assembly for a wind turbine comprising:
   a gearbox;
   a rotor;
   a gearbox input shaft connected to the gearbox and a rotor rotation shaft connected to the rotor,
   the rotor rotation shaft having a radially outer surface and the gearbox input shaft having a front surface, the gearbox input shaft and the rotor rotation shaft being connected to each other by a union with a flange comprising a base portion with a vertical end surface and a band extending axially from the base portion, the base portion comprising a plurality of bolts extending through the base portion of the flange and into the front surface of a gearbox module of the gearbox input shaft, wherein
   the flange has a radially internal surface and forms an interference joint between the radially outer surface of the rotor rotation shaft and the radially internal surface of the band, the flange being banded on the rotor rotation shaft by means of the interference joint, and
   the flange been banded on the rotor rotation shaft by prior heating to a banding temperature, assembling the heated flange to the rotor rotation shaft, and allowing the heated flange on the rotor rotation shaft to cool so that the joint becomes banded on the rotor rotation shaft after cooling; and
   wherein the interference joint includes a keyway between the rotor rotation shaft and the radially internal surface of the flange.

5. The drive train assembly according to claim 4, wherein the keyway is inside the rotor rotation shaft extending along an outer edge of the periphery of said rotor rotation shaft, and a key is inside the keyway.

6. The drive train assembly according to claim 4, wherein the flange is a single part and made of structural steel.

7. A drive train assembly for a wind turbine comprising:
   a gearbox;
   a rotor;
   a gearbox input shaft connected to the gearbox and a rotor rotation shaft connected to the rotor,
   the rotor rotation shaft having a radially outer surface and the gearbox input shaft having a front surface, the gearbox input shaft and the rotor rotation shaft being connected to each other by a union with a flange comprising a base portion with a vertical end surface and a band extending axially from the base portion, the base portion comprising a plurality of bolts extending through the base portion of the flange and into the front surface of a gearbox module of the gearbox input shaft, wherein
   the flange has a radially internal surface and forms an interference joint between the radially outer surface of the rotor rotation shaft and the radially internal surface of the band, the flange being banded on the rotor rotation shaft by means of the interference joint, and
   the radially internal surface of the flange has an increased friction coefficient achieved by surface treatment, and
   the flange which has been banded on the rotor rotation shaft by prior heating to a banding temperature, assembling the heated flange to the rotor rotation shaft, and allowing the heated flange on the rotor rotation shaft to cool so that the joint becomes banded on the rotor rotation shaft after cooling; and wherein the interference joint includes a keyway between the rotor rotation shaft and the radially internal surface of the flange.

8. The drive train assembly according to claim 7, wherein the keyway is inside the rotor rotation shaft extending along an outer edge of the periphery of said rotor rotation shaft, and a key is inside the keyway.

9. The drive train assembly according to claim 7, wherein the flange is a single part and made of structural steel.

10. A drive train assembly for a wind turbine comprising:
a gearbox;
a rotor;
a gearbox input shaft connected to the gearbox and a rotor rotation shaft connected to the rotor,
the rotor rotation shaft having a radially outer surface and the gearbox input shaft having a front surface, the gearbox input shaft and the rotor rotation shaft being connected to each other by a union with a flange comprising a base portion with a vertical end surface and a band extending axially from the base portion, the base portion comprising a plurality of bolts extending through the base portion of the flange and into the front surface of a gearbox module of the gearbox input shaft, wherein
the flange is a single part and made of structural steel,
the flange has a radially internal surface and forms an interference joint between the radially outer surface of the rotor rotation shaft and the radially internal surface of the band, the flange being banded on the rotor rotation shaft by means of the interference joint, and
the radially internal surface of the flange has an increased friction coefficient achieved by surface treatment, and
the flange been banded on the rotor rotation shaft by prior heating to a banding temperature, assembling the heated flange to the rotor rotation shaft, and allowing the heated flange on the rotor rotation shaft to cool so that the joint becomes banded on the rotor rotation shaft after cooling; and wherein the interference joint includes a keyway between the rotor rotation shaft and the radially internal surface of the flange.

11. The drive train assembly according to claim 10, wherein the keyway is inside the rotor rotation shaft extending along an outer edge of the periphery the width of said rotor rotation shaft and internal surface of the flange, and a key is inside the keyway.

12. A drive train assembly for a wind turbine comprising:
a gearbox;
a rotor;
a gearbox input shaft connected to the gearbox and a rotor rotation shaft connected to the rotor,
the rotor rotation shaft having a radially outer surface and the gearbox input shaft having a front surface, the gearbox input shaft and the rotor rotation shaft being connected to each other by a union with a flange comprising a base portion with a vertical end surface and a band extending axially from the base portion, the base portion comprising a plurality of bolts extending through the base portion of the flange and into the front surface of a gearbox module of the gearbox input shaft, wherein
the flange is a single part and made of structural steel,
the flange has a radially internal surface and forms an interference joint between the radially outer surface of the rotor rotation shaft and the radially internal surface of the band, the flange being banded on the rotor rotation shaft by means of the interference joint, and
the radially internal surface of the flange has an increased friction coefficient achieved by surface treatment, and
the interference joint includes a keyway between the rotor rotation shaft and the internal surface of the flange, wherein the keyway is inside the rotor rotation shaft extending along an outer edge of the periphery of said rotor rotation shaft, and a key is inside the keyway, and
the flange has been banded on the rotor rotation shaft by prior heating to a banding temperature, assembling the heated flange to the rotor rotation shaft, and allowing the heated flange on the rotor rotation shaft to cool so that the joint becomes banded on the rotor rotation shaft after cooling.

\* \* \* \* \*